(12) United States Patent
Chen et al.

(10) Patent No.: US 6,501,758 B1
(45) Date of Patent: Dec. 31, 2002

(54) HYBRID ATM/TDM TRANSPORT OVER A COMMON FIBER RING

(75) Inventors: David X. Chen, Plano, TX (US); Edward T. Sullivan, Highland Village, TX (US)

(73) Assignee: Fujitsu Network Communications, Inc., Richardson, TX (US)

( * ) Notice: Subject to any disclaimer, the term of this patent is extended or adjusted under 35 U.S.C. 154(b) by 0 days.

(21) Appl. No.: 09/326,141

(22) Filed: Jun. 3, 1999

(51) Int. Cl.[7] .............................................. H04L 12/64
(52) U.S. Cl. ..................... 370/395.1; 370/354; 370/466
(58) Field of Search ............................... 370/395.1, 352, 370/353, 354, 355, 356, 466, 222, 223, 228

(56) References Cited

U.S. PATENT DOCUMENTS

| | | | |
|---|---|---|---|
| 4,339,633 A | 7/1982 | Ahmed | 179/99 M |
| 4,631,641 A | 12/1986 | Brombal et al. | 361/424 |
| 4,893,306 A | 1/1990 | Chao et al. | 370/94.2 |
| 4,926,416 A * | 5/1990 | Werk | |
| 5,012,469 A | 4/1991 | Sardana | 370/95.3 |
| 5,130,984 A | 7/1992 | Cisneros | 370/94.1 |
| 5,173,901 A * | 12/1992 | DeSomer | |
| 5,278,833 A | 1/1994 | Crisler et al. | 370/95.1 |
| 5,295,140 A | 3/1994 | Crisler et al. | 370/94.1 |
| 5,303,234 A | 4/1994 | Kou | 370/85.2 |
| 5,412,652 A | 5/1995 | Lu | 370/85.12 |
| 5,467,348 A | 11/1995 | Fujii et al. | 370/60.1 |
| 5,515,376 A | 5/1996 | Murthy et al. | 370/85.13 |
| 5,537,403 A | 7/1996 | Cloonan et al. | 370/60.1 |
| 5,677,905 A | 10/1997 | Bigham et al. | 370/94.2 |
| 5,689,506 A | 11/1997 | Chiussi et al. | 370/388 |
| 5,712,851 A | 1/1998 | Nguyen et al. | 370/399 |
| 5,771,234 A | 6/1998 | Wu et al. | 370/396 |
| 5,796,720 A | 8/1998 | Yoshida et al. | 370/245 |
| 5,805,568 A | 9/1998 | Shinbashi | 370/223 |
| 5,838,924 A | 11/1998 | Anderson et al. | 395/200.69 |
| 5,841,771 A | 11/1998 | Irwin et al. | 370/360 |
| 5,867,502 A | 2/1999 | Chang | 370/477 |
| 5,982,776 A | 11/1999 | Manning et al. | 370/414 |

(List continued on next page.)

FOREIGN PATENT DOCUMENTS

| | | | |
|---|---|---|---|
| EP | 0 509 648 A1 | 10/1992 | H04L/12/56 |
| EP | 0 680 235 A1 | 11/1995 | H04Q/11/04 |
| EP | 0 700 186 A1 | 3/1996 | H04L/12/56 |
| EP | 0 817 439 A2 | 1/1998 | H04L/12/56 |
| EP | 0 818 940 A2 | 1/1998 | H04Q/11/04 |
| EP | 0 868 058 A1 | 9/1998 | H04L/12/56 |
| EP | 0 901 307 A2 | 3/1999 | H04Q/11/04 |
| WO | WO 99/09689 | 2/1999 | H04J/3/16 |

OTHER PUBLICATIONS

International Search Report in International Application No. PCT/US00/15425, dated Sep. 7, 2000, 6 pages.

(List continued on next page.)

*Primary Examiner*—Ken Vanderpuye
(74) *Attorney, Agent, or Firm*—Baker Botts L.L.P.

(57) ABSTRACT

A method of transporting asynchronous transfer mode cells and time-division multiplexed information over a common fiber ring includes receiving a plurality of incoming signals comprising asynchronous transfer mode cells, legacy data, or time-division multiplexed information, formatting the plurality of incoming signals into a first plurality of incoming transport signals comprising asynchronous transfer mode cells and a second plurality of incoming transport signals comprising time-division multiplexed information, constructing from the first plurality of incoming transport signals a first outgoing synchronous transfer mode signal comprising at least one asynchronous transfer mode cell, constructing from the second plurality of incoming transport signals a second outgoing synchronous transfer mode signal comprising time-division multiplexed information, and transmitting the first and second outgoing synchronous transfer mode signals over a common fiber ring.

29 Claims, 8 Drawing Sheets

U.S. PATENT DOCUMENTS

| | | | | |
|---|---|---|---|---|
| 6,067,301 | A | | 5/2000 | Aatresh .................... 370/418 |
| 6,134,238 | A | * | 10/2000 | Woh ......................... 370/230 |
| 6,144,669 | A | | 11/2000 | Williams et al. ............ 370/401 |
| 6,317,426 | B1 | * | 11/2001 | Afanador ................... 370/352 |
| 6,359,859 | B1 | * | 3/2002 | Brolin et al. ............... 370/218 |
| 6,418,215 | B1 | * | 7/2002 | Schessel ................ 370/207.02 |

OTHER PUBLICATIONS

Kurimoto, et al., "An Expandable Multicast ATM Switch Based on Copy Trunk with New Delay Control and Cell Spacing Functions, XP 000628644," *IEICE Trans. Commun.*, vol. E79B, No. 8, Aug., 1996, 7 pages.

Subramaniam, et al., Multicasting in ATM networks using MINs[1], *Computer Communications 19*, 1996, 11 pages.

International Search Report in International Application No. PCT/US00/15336, dated Sep. 4, 2000, 7 pages.

PCT International Search Report in International Application No. PCT/US00/15337, dated Aug. 24, 2000, 7 pages.

K. Sriram, "Methodologies for bandwidth allocation, transmission scheduling, and congestion avoidance in broadband ATM networks," *Computer Networks and ISDN Systems*, vol. 26, No. 1, Sep., 1993, 17 pages.

Fabrice Guillemin, et al., "Some Traffic Aspects in Virtual Private Networks over ATM," XP–000702583, Source Unknown, Apr., 1996, 12 pages.

Noriharu Miyaho, et al., "Integrated Switching Architecture and Its Traffic Handling Capacity in Data Communication Networks," XP 000692355, *IEEE Trans. Commun.*, vol. E79–B, No. 12, Dec., 1996, 13 pages.

International Search Report in International Application No. PCT/US 00/15131, dated Sep. 7, 2000, 6 pages.

PCT Written Opinion in International Application No. PCT/US00/15131, dated Nov. 8, 2001, 5 pages.

"General Aspects of Digital Transmission Systems," XP–002083788, ITU–T Recommendation G.708, *ITU–T Telecommunication Standardization Section of ITU*, Mar., 1993, 19 pages.

International Search Report in International Application No. PCT/US00/15331, dated Aug. 31, 2000, 6 pages.

Wu, et al., "A Broadband Virtual Path SONET/ATM Self–Healing Ring Architecture and Its Economic Feasibility Study," *IEEE Global Telecommunications Conference*, Dec. 6–9, 1992, 8 pages.

Tsong–Ho Wu, "Cost–Effective Network Evolution, A three–phase path from todays SONET/STM ring transport to a SONET/ATM VP ring transport could facilitate the network evolution for broadband service," *IEEE Communications Magazine*, Sep. 1993, 10 pages.

M.Huterer, "ATM on SDH," *Alcatel Telecommunications Review*, 1st Quarter, 1997, 9 pages.

Tai H. Noh, ATM Scenarios for SDH/SONET Networks, XP–000750438, *Bell Labs Technical Journal*, Jan.–Mar. 1998, 13 pages.

International Search Report in International Application No. PCT/US 00/15426, dated Sep. 21, 2000, 7 pages.

PCT Written Opinion in International Application No. PCT/US00/15426, dated Jun. 26, 2001, 5 pages.

McDysan, David E., et al., *ATM Theory and Application*. McGraw–Hill, Inc. ISBN 0–07–060362–6, pp. 365–385, 1994.

Erdengiz, Ali, "ATM Usage Policing and Traffic Shaping," Communications System Design (Jan. 1997).

Dobrowski, George et al., *ATM User–Network Interface Specification, Version 3.1*, The ATM Forum, Sep. 1994.

Cerent 454™ High Speed SONET/SDH Transport System, ALTS trade show, Las Vegas, Nevada on or about Dec., 1998.

"FLM 150 ADM LAN Extension Product Design Specification," Revision 1.1, Internal Design Specification for Product, sheets 6/353–10/353 and 72/353–75/353, Product publicly released on or about Dec. 1998.

"Product Design Specification (PDS) for FLASH–192, Release 1," Internal Design Specification for Product, pp. 1/916; 4–12/9161 315–320/916, Product publicly released on or about Mar., 1999.

"InterNetworking Systems; AnyMedia® Access Products; AnyMedia Access System," http://www.lucent.com/ins/products/anymedia.html, Printed Aug. 10, 2000.

"AnyMedia® Access System," Lucent Technologies, Inc. Marketing Communications, Sep. 1999.

"The AnyMedia™ Access System Anything's Possible," Lucent Technologies, Inc. Marketing Communications, 1997.

Photography of Northern Telecom Card, card dated Apr., 1998.

Held, G., *Understanding Data Communications*, Fifth Edition, Sams Publishing. ISBN No. 0–672–30934–3, Chapter 14, pp. 419–431, 1996.

McCloghrie, K., et al., "Management Information Base for Network Management of TCP/IP–based internets: MIB–II," SNMP Working Group, Mar. 1991.

"Draft New Recommendation 1.630 (ATM Protection Switching)," ITU Telecommunication Standardization Sector, COM 13–41–E, Sep. 1998.

Guérin, R., et al., "Equivalent Capacity and its Application to Bandwidth Allocation in High–Speed Networks," IEEE Journal on Selected Areas in Communications, vol. 9, No. 7, pp. 968–981, Sep. 1991.

Gün, L., et al., "Bandwidth Management and Congestion Control Framework of the Broadband Network Architecture," Computer Networks and ISDN Systems 26, Elsevier Science Publishers, B.V., North–Holland, pp. 61–78, 1993.

"S/DMS TransportNode 'OC–3 Express'—Cost–Effective SONET Transport for Low–Capacity Applications", Northern Telecom Marketing Publications, Issue 1, pp. 1–31, Sep. 27, 1996.

Universal Serial Bus Specification Revision 1.1, Compaq Computer Corporation, Intel Corporation, Microsoft Corporation, NEC Corporation, Sep. 23, 1998.

"MMC Products," http://www.mc–net.com/top–roducts/productdescriptions.html, printed Jul. 22, 1999.

"MMC Network's Products: AnyFlow 5400," http://www.mmcnet.com/Solutions/anyflow5400.asp., printed Feb. 7, 2000.

"MMC Network's Products: AnyFlow 5500," http://www.mmcnet.com/Solutions/anyflow5500.asp., Printed Feb. 7, 2000.

"AnyFlow 5400 Product Overview," MMC Networks, Undated.

"AnyFlow 5500 Product Overview," MMC Networks, Undated.

SwitchStAR™ ATM Cell Based 8 X 8 Non–Blocking Single Chip Switching Memory, Preliminary IDT77V400, Commercial Temperature Range, Integrated Device Technology, Inc., pp. 1–23, May 1998.

SwitchStAR™ ATM Cell Based 8 X 8 Non–Blocking Single Chip Switch Controller, Preliminary IDT77V500, Commercial Temperature Range, Integrated Device Technology, Inc., pp. 1–14, May 1998.

Giroux, Natalie et al., *Traffic Management Specification*, Version 4.0, af–tm–0056.000, The ATM Forum, Apr. 1996.

*M4 Interface Requirements and Logical MIB*, af–nm–0020.000, The ATM Forum, Oct. 1994.

* cited by examiner

→ WORKING CHANNEL
⇢ PROTECTION CHANNEL

→ TDM WORKING CHANNEL
⇢ TDM PROTECTION CHANNEL
⇾ ATM CHANNEL

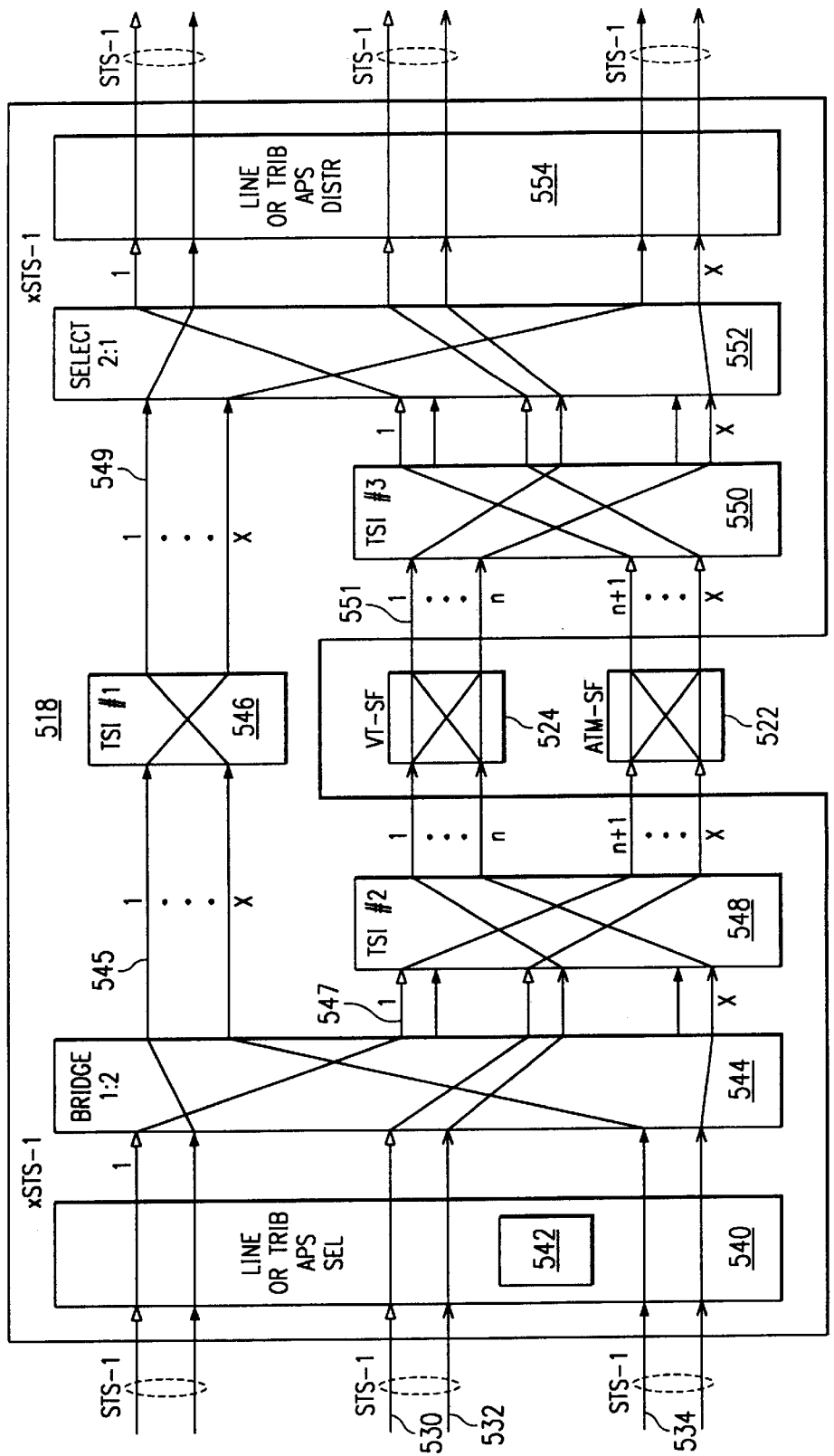

HYBRID ATM/TDM TRANSPORT OVER A COMMON FIBER RING

STATEMENT OF RELATED APPLICATIONS

This application is related to co-pending Application Serial No. 09/325,698, entitled SWITCHING COMPLEX ARCHITECTURE AND OPERATION, and filed on Jun. 3, 1999.

TECHNICAL FIELD OF THE INVENTION

The present invention relates to the field of communications systems, and more particularly to a system and method for facilitating hybrid ATM/TDM transport over a common fiber ring.

BACKGROUND OF THE INVENTION

Communication networks employing fiber optic rings as transmission media are typically limited to transmitting time division multiplexed information, making no provision for the transmission of asynchronous transfer technologies, such as asynchronous transfer mode ("ATM") cells. Those systems that do attempt to communicate ATM traffic over a fiber ring typically map ATM cells into synchronous transport mode (STM) signals, and provide no ATM layer processing at nodes residing on the ring. These systems only provide switching of the STM signals carrying the ATM cells, not of the cells themselves.

SUMMARY OF THE INVENTION

In accordance with the present invention, a method of transporting ATM cells and TDM information over a common fiber ring comprises receiving a plurality of incoming signals comprising ATM cells, legacy data, or TDM information, formatting the plurality of incoming signals into a first plurality of incoming transport signals comprising ATM cells and a second plurality of incoming transport signals comprising TDM information constructing from the first plurality of incoming transport signals a first outgoing STM signal comprising at least one ATM cell, constructing from the second plurality of incoming transport signals a second outgoing STM signal comprising TDM information and transmitting the first and second outgoing STM signals over a common fiber ring.

Technical advantages of the present invention include a system and method for efficiently communicating signals carrying asynchronous transfer mode cells and signals carrying TDM information over a common fiber ring. Through a variety of configurations and modes of operation, the invention provides flexibility in the distribution of bandwidth between ATM and TDM traffic. In facilitating various bandwidth allocations between TDM and ATM traffic, the invention provides significant advantages in terms of network flexibility and adaptability to future processing demands. In addition, by providing ATM layer processing functionality at at least some of the nodes residing on the fiber ring, the invention facilitates a high granularity in switching ATM information carried in STM signals.

Other technical advantages are readily apparent to one of skill in the art from the attached figures, description, and claims.

BRIEF DESCRIPTION OF THE DRAWINGS

For a more complete understanding of the present invention, and for further features and advantages thereof, reference is now made to the following description taken in conjunction with the accompanying drawings, in which:

FIG. 3 is a block diagram of a portion of an exemplary node on a fiber ring constructed according to the teachings of the present invention.

DETAILED DESCRIPTION OF THE INVENTION

Figure 1:
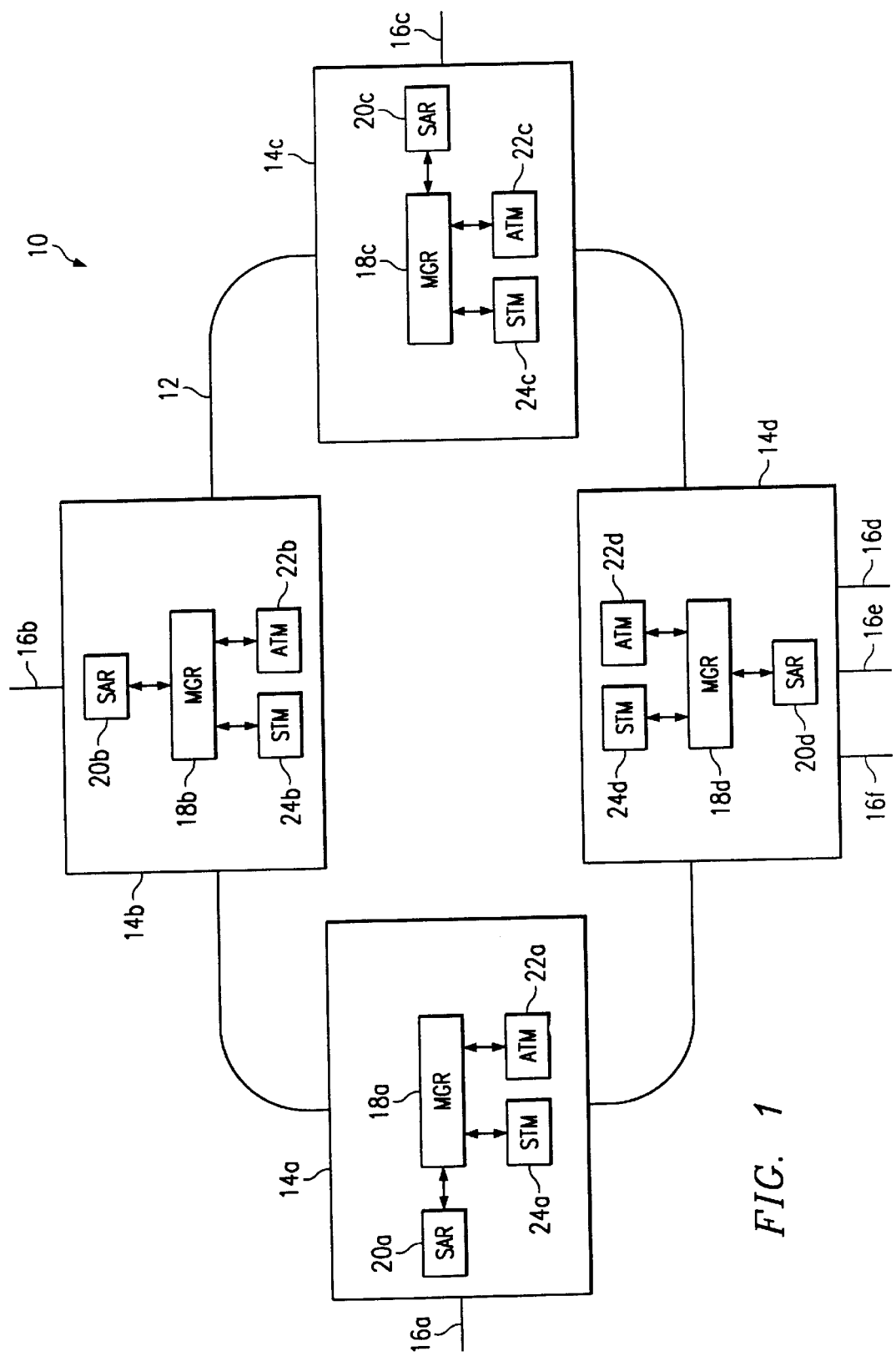
FIG. 1 is a block diagram of an exemplary system operable to facilitate communication of asynchronous transfer mode cells and time-division multiplexed information using a common fiber ring.

FIG. 1 is a block diagram of an exemplary system 10 operable to facilitate communication of asynchronous transfer mode (ATM) cells and time-division multiplexed (TDM) information using a common fiber ring. Throughout this description, the terms "asynchronous transfer mode" and "ATM" contemplate not only current versions and standards associated with ATM technology, but also other later revisions, modifications, enhancements, or new types of cell transfer techniques.

System 10 includes a fiber ring 12. Fiber ring 12 may comprise, for example, a two-fiber ring configured in a uni-directional path-switched ring (UPSR) mode, or a bi-directional path-switched ring (BLSR) mode. Other ring configurations could be implemented without departing from the scope of the invention. Fiber ring 12 may be configured as a synchronous optical network (SONET), as a synchronous digital hierarchy (SDH) network, or other optical network configuration.

System 10 further includes a plurality of nodes 14 residing on fiber ring 12. For purposes of this example, fiber ring 12 includes four nodes 14a–14d. Each node 14 receives synchronous transport mode (STM) signals from fiber ring 12. In addition, one or more nodes 14 may receive signals having various formats from tributaries 16. In the illustrated embodiment, tributaries 16 allow nodes 14 to communicate with network elements not residing on ring 12. Tributaries 16 may comprise any of a variety of transmission media carrying various signal formats, such as, ATM cells, legacy data, and/or TDM information. In the illustrated embodiment, node 14a receives asynchronous transfer mode traffic from an OC-3c cell relay line 16a; node 14b receives legacy data in the form of frame relay signals over a local area network 16b; node 14c receives ATM cells and/or TDM information over DS-3 lines 16c; and node 14d receives ATM cells and/or TDM information over DS-1 lines 16d, OC-3 lines 16e, and STS-1 lines 16f. The illustrated embodiment merely provides examples of the types of transmission media comprising tributaries 16. Other transmission media types could be implemented without departing from the scope of the invention.

Nodes 14 interfacing tributaries 16 carrying legacy data may also include a segmentation and reassembly (SAR) module 20. Segmentation and reassembly module 20 receives legacy data from, for example, local area network tributary 16b, and segments the legacy data into ATM cells. In addition, segmentation and reassembly module 20 receives outgoing signals containing ATM cells, and reassembles legacy data for transport across particular tributaries 16.

Each node 14 includes a signal manager (MGR) 18. Signal manager 18 provides an interface between incoming signals containing ATM cells and/or TDM information from ring 12 and/or tributaries 16 and switching fabrics within node 14. Signal manager 18 operates to receive incoming signals having a plurality of formats, and to process the incoming signals to form a plurality of transport signals. Throughout this description, the term "transport signal" refers to a common signal format used for transmission of signals within each node 14. In this embodiment, transport signals comprise synchronous transfer signal level-n (STS-n) signals. As a particular example, signal manager 18 may receive an OC-12 signal from fiber ring 12 and a plurality of DS-1 signals from tributaries 16. To prepare these signals for transmission to switching fabrics within node 14, signal manager extracts twelve STS-1 signals from the OC-12 signal received from fiber ring 12, and assembles one or more STS-1 signals from the DS-1 signals received from tributaries 16. In this example, the transport signals comprise STS-1 signals. Other STS level signals, or combinations of STS level signals could be used as transport signals without departing from the scope of the invention. In addition, synchronous digital hierarchy signals could also be used as transport signals without departing from the scope of the present invention.

Each node 14 includes an STM switching fabric 24. STM switching fabric 24 includes hardware, software, and/or firmware operable to facilitate various STM signal routing and switching functions. In a particular embodiment, STM switching fabric includes a primary rate switching fabric and a sub-rate switching fabric. The primary rate switching fabric may comprise, for example, a time slot interchange operable to switch signals at a primary rate. As a particular example, primary rate switching fabric may comprise a time slot interchange operable to switch transport signals at an STS-1 rate. The sub-rate switching fabric comprises a switching fabric operable to switch transport signals at a more granular rate than the primary rate switching fabric. As a particular example, where the primary rate switching fabric comprises a time slot interchange switching at an STS-1 level, the sub-rate switching fabric may comprise, for example, a virtual tributary (VT) cross-connect operable to switch VT traffic carried within the transport signals.

In the illustrated embodiment, each node 14 includes an ATM switching fabric 22, although in other embodiments, some nodes 14 may not include an ATM switching fabric. In this embodiment, ATM switching fabric comprises an add/drop multiplexer operable to drop ATM cells from one incoming transport signal and to add those and/or other ATM cells to other transport signals. ATM switching fabric may comprise any hardware, software, firmware, or combination thereof operable to rearrange the order and/or content of ATM cells carried by the signals it receives.

Although signal manager 18, segmentation and reassembly module 20, ATM switching fabric 22, and STM switching fabric 24 are depicted as separate physical elements, any two or more of these elements could be combined on one or more integrated circuits, line cards, or circuit boards without departing from the scope of the invention. The invention is not intended to be limited to a particular physical arrangement of the functional elements. As a particular example, the functionality of signal manager 18 and STM switching fabric 24 (or a part thereof) could be integrated into a single circuit element. Other combinations and subcombinations are intended within the scope of the invention.

In operation, signal manager 18 receives from ring 12 and/or tributaries 16 a plurality of incoming signals containing TDM information and ATM cells. Signal manager 18 may also receive incoming signals containing segmented ATM cells from segmentation and reassembly module 20. Signal manager 18 formats each incoming signal into one or more transport signals, in this case STS-1 signals.

Signal manager 18 transmits incoming transport signals containing TDM information to STM switching fabric 24. STM switching fabric 24 switches these signals at either the primary rate or a sub-rate, depending on the processing needs of each incoming signal. Signal manager 18 transmits at least the incoming transport signals requiring ATM layer processing ATM switching fabric 22, where ATM switching fabric 22 performs ATM layer processing depending on the contents of the signal received. In this embodiment, the ATM layer processing comprises dropping ATM cells from ones of the incoming transport signals and adding ATM cells to others. It should be recognized that the ATM cells dropped from the incoming transport signals are typically delivered from ring 12 to tributaries 16, and are not discarded. In some configurations, signal manager 18 may recognize particular incoming transport signals carrying ATM cells as pass-through traffic. In that case, signal manager 18 may transmit the pass-through ATM traffic to a primary rate switching fabric of STM switching fabric 24. Those pass-through signals, therefore, pass transparently through node 14—in other words, the ATM cells in the pass-through signals can be transmitted without loading ATM switching fabric 22.

Switched transport signals carrying TDM traffic emerge from STM switching fabric 24. Similarly, switched transport signals carrying ATM cells emerge from ATM switching fabric 22. Those outgoing signals bound for network elements coupled to node 14 via tributaries 16 may be reformatted into signals appropriate for transport over tributaries 16 as necessary. For example, switched transport signals carrying ATM cells may be reassembled into legacy data to be transmitted to a network element coupled to node 14 by a local area network 16. Switched transport signals destined for another node 14 on ring 12 are formatted into an appropriate signal for transmission over ring 12. For example, switched STS-1 signals carrying TDM information and ATM cells can be formatted into one or more OC-12 signals for transmission over ring 12.

System 10 facilitates effective and efficient communication of ATM and TDM traffic over a common fiber ring. Through a variety of configurations and modes of operation, system 10 provides flexibility in the distribution of bandwidth between ATM and TDM traffic. For example, if one type of traffic dominates the ring, system 10 can be configured to focus the majority of its resources on communicating that type of traffic, while still maintaining some processing capability for the other type. If, on the other hand, fiber ring 12 commonly transports more equal distributions of TDM and ATM signals, system 10 can be configured to allocate an approximately equal bandwidth distribution to each. In facilitating various bandwidth allocations between TDM and ATM traffic, system 10 provides significant advantages in terms of network flexibility and adaptability to future processing demands. In addition, by providing ATM layer processing functionality at at least some of nodes 14 on fiber ring 12, system 10 facilitates a high granularity in switching ATM information carried in STM signals.

Figure 2A:
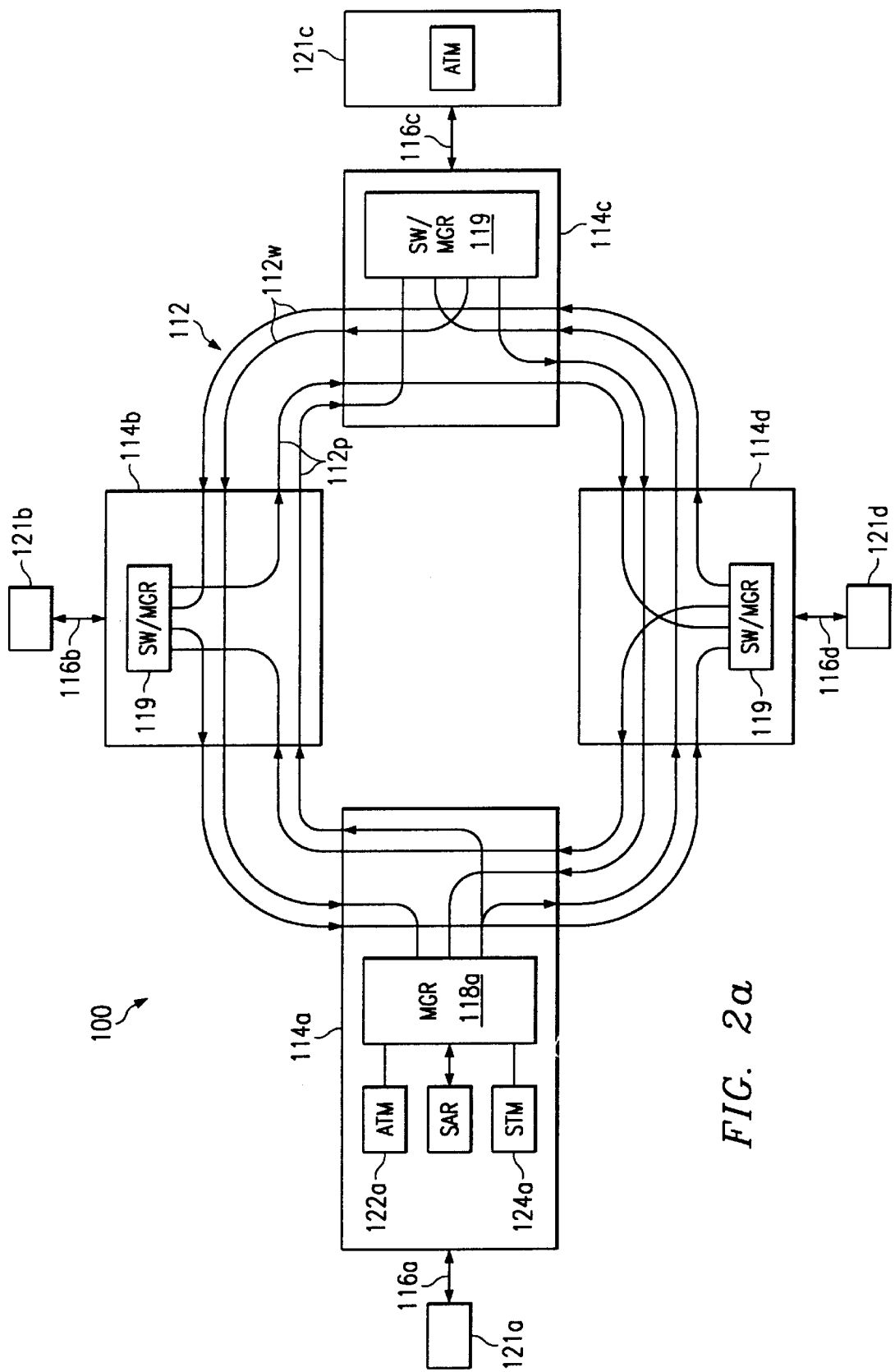
FIGS. 2a–2c are block diagrams showing exemplary configurations of fiber rings implementing the present invention.
Figure 2B:
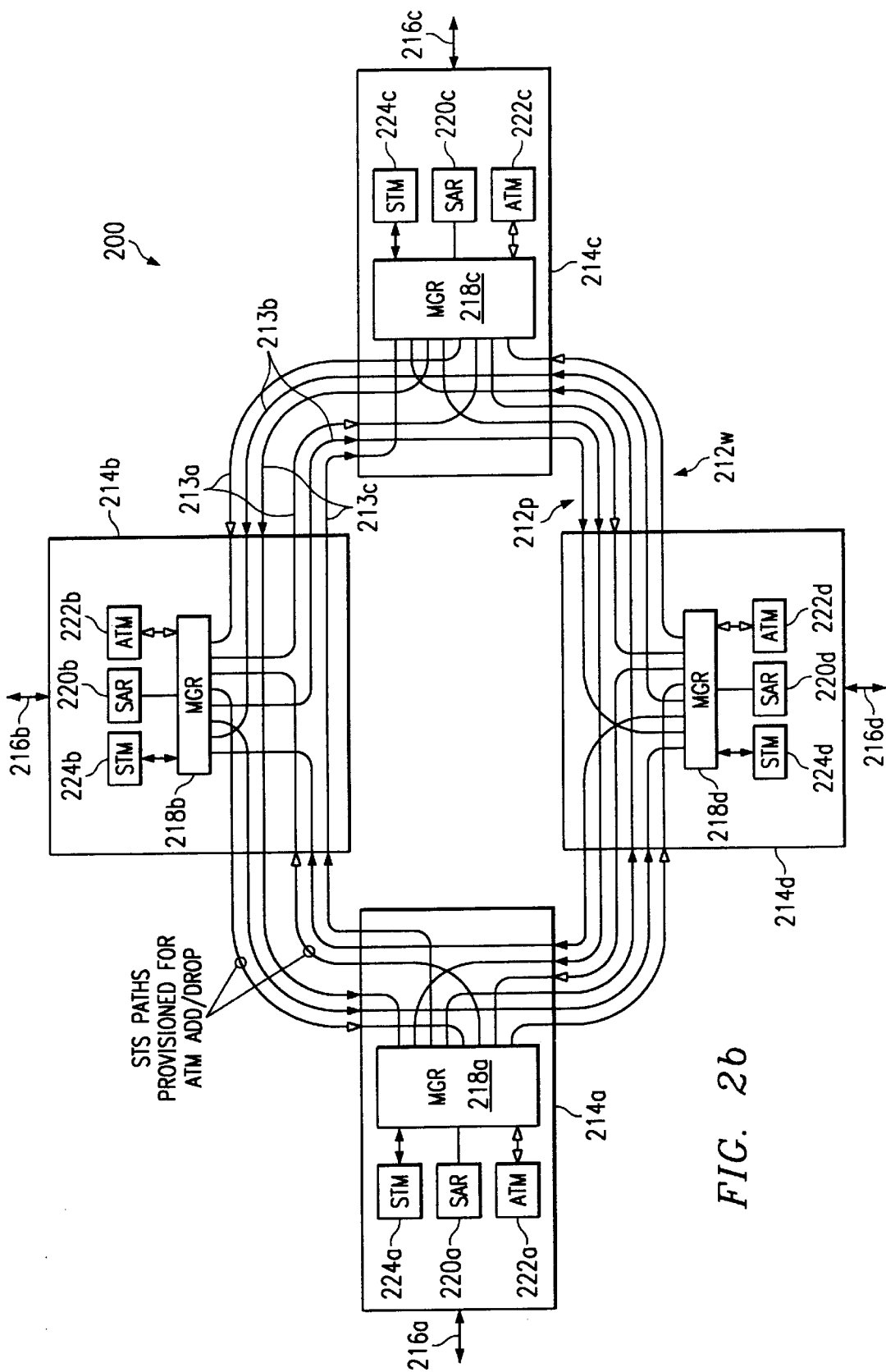
Figure 2C:
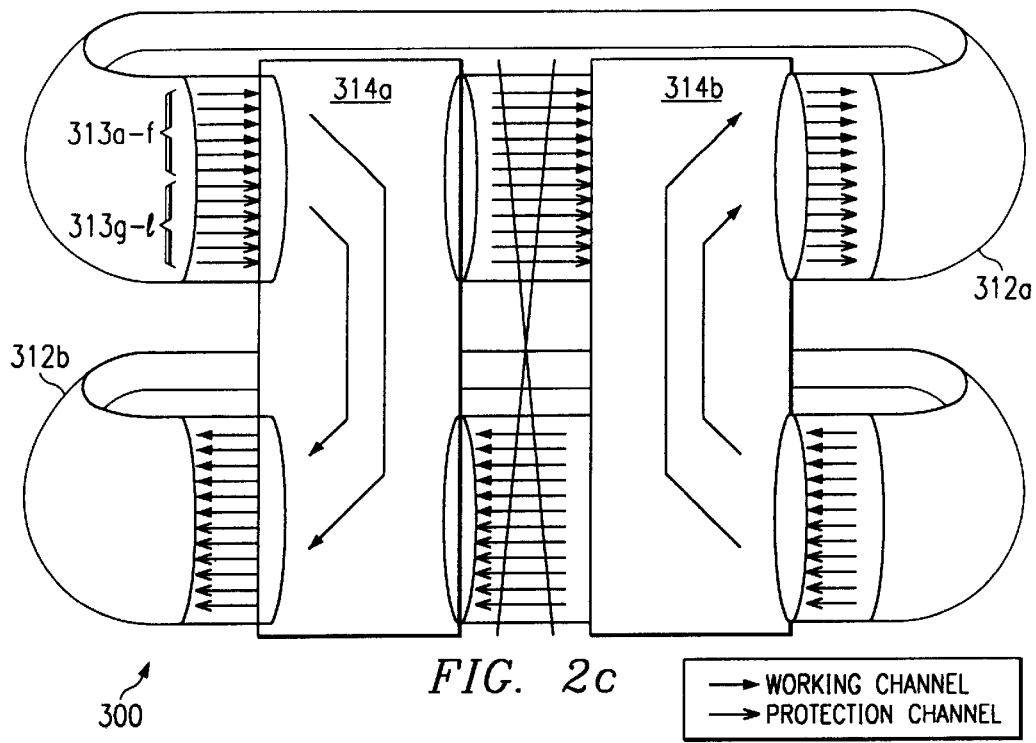

FIGS. 2a–2c are block diagrams showing exemplary configurations of fiber rings implementing the present invention.

FIG. 2a is a block diagram of a system 100 operable to facilitate transparent transmission of ATM cells over a fiber ring carrying ATM and TDM traffic. System 100 includes a fiber ring 112. In the illustrated embodiment, fiber ring 112 comprises a two-fiber ring configured in a uni-directional path-switched ring mode having a working fiber 112w and a protection fiber 112p. Fiber ring 112 could alternatively be configured, for example, in a two or four fiber bi-directional line-switched ring mode.

System 100 includes a plurality of nodes 114 residing on fiber ring 112. In this example, node 114a comprises a node similar in structure and function to nodes 14 described with reference to FIG. 1. Like nodes 14, node 114a includes a signal manager (MGR) 118a, which operates to receive incoming signals from fiber ring 112 and tributaries 116a. Signal manager 118a performs various administrative and routing functions, including selecting between working path 112w and protection path 112p as well as formatting incoming signals into incoming transport signals and routing the transport signals to and from an ATM switching fabric 122a and an STM switching fabric 124a.

Nodes 114b–114d of system 100 are similar to node 114a in that they receive and facilitate processing and routing of various signals over fiber ring 112 and tributaries 116. Each node 114b–114d includes a switching fabric/signal manager (SW/MGR) 119 operable to perform various administrative, routing and switching functions. Switching fabric/signal manager 119 includes an STM switching fabric and may, or may not include an ATM switching fabric similar to switching fabric 122a.

In operation, node 114a receives a plurality of incoming signals from fiber ring 112 and/or tributaries 116a, and formats the incoming signals into incoming transport signals. Some of the incoming signals include TDM information, and some include ATM cells. One or more of the incoming signals containing TDM information may require sub-rate switching, while some of the incoming signals containing ATM cells may require ATM layer processing. Others of the incoming signals containing TDM information or ATM cells may be pass-through signals, not requiring sub-rate switching or ATM layer processing.

In this particular embodiment, STM switching fabric 124 includes both a primary rate switching fabric and a sub-rate switching fabric. The primary rate switching fabric may comprise, for example, a time slot interchange operable to facilitate switching the incoming signals at a primary rate, such as an STS-1 rate. The sub-rate switching fabric comprises a switching fabric providing more granular switching than that provided by the primary rate switching fabric. In a particular embodiment, the sub-rate switching fabric may comprise, for example, a VT cross-connect.

Signal manager 118a passes incoming transport signals carrying TDM information to STM switching fabric 124a, where those signals are processed to form switched transport signals carrying TDM information. The processing occurring in STM switching fabric 124a may comprise, for example, time slot interchanging or sub-rate switching. In forming the switched transport signals, STM switching fabric maps outgoing signals carrying TDM information bound for a common destination into a synchronous payload envelope encoded with overhead information specifying that destination.

Signal manager 118a also passes incoming transport signals carrying ATM cells to ATM switching fabric 122a. ATM switching fabric 122a facilitates dropping of ATM cells from ones of the incoming transport signals carrying ATM cells and addition of ATM cells onto selected transport signals. ATM switching fabric produces switched transport signals containing ATM cells. In forming the switched transport signals carrying ATM cells, ATM switching fabric 24 maps signals having a common destination into a synchronous payload envelope encoded with overhead information specifying the cells' destination. In this example, signal manager 118a maps the outgoing signals carrying ATM information into a synchronous payload envelope destined for an ATM switch 130 coupled to node 114c through tributaries 116c.

Signal manager 118 receives switched transport signals carrying TDM information and ATM cells from STM switching fabric 124 and ATM switching fabric 122, respectively. Signal manager 18 then maps the outgoing transport signals into signals appropriate for transmission over fiber ring 112 and/or tributaries 116. For example, a plurality of outgoing STS-1 signals can be mapped into one or more OC-12 signals for transmission over ring 112.

The switched transport signals carrying ATM cells are mapped into STM signals in the same way as the switched transport signals carrying TDM information, and both types of signals can be transported using the same fiber ring. In addition, because the switched transport signals carrying ATM cells are mapped into synchronous payload envelopes specifying the destination of the ATM cells, these signals can be transported over fiber ring 112—through intermediate nodes 114b–114d—regardless of whether intermediate nodes 114b–114d contain an ATM switching fabric.

Because the ATM cells are mapped into STM signals, intermediate nodes 114b–114d need not include ATM switching fabrics to accommodate transmission of the STM-mapped ATM cells bound for the destination network element. Where intermediate nodes 114b–114d do include an ATM switching fabric, system 100 provides an advantage of facilitating transmission of the outgoing ATM cells through the intermediate nodes 114b–114d without loading the ATM switching fabrics of these intermediate nodes. In either case, intermediate nodes 114b–114d treat the outgoing signals, whether carrying TDM information or ATM cells, as an STM signal. The overhead information associated with the outgoing STM signals—whether containing TDM information or ATM cells—tells signal managers 118b–118d of the intermediate nodes 114b–114d to pass the STM signal onto the next network element without processing the contents of the STM signal. Outgoing signals carrying ATM cells can, therefore, be transported transparently through nodes 114 intermediate the source node 114a and the destination network element 130.

FIG. 2b is a block diagram of a system 200 operable to facilitate communication of TDM information and ATM cells over a common fiber ring using separate STS paths for TDM and ATM traffic. System 200 includes a fiber ring 212 having a working fiber 212w and a protection fiber 212p. In the illustrated embodiment, fiber ring 212 comprises a two fiber ring configured in a uni-directional path-switched ring configuration.

In this particular embodiment, fiber ring 212 comprises an OC-3 ring having three distinct STS paths 213a–213c. STS paths 213b and 213c are configured in a uni-directional switched-ring mode. These STS paths are used to carry TDM traffic between nodes 214 residing on fiber ring 212. TDM traffic is represented in FIG. 2b using shaded arrowheads. In this embodiment, STS path 213a is reserved for ATM traffic. ATM traffic is represented in FIG. 2b by unshaded arrowheads.

Although the illustrated embodiment is described with respect to an OC-3 ring configuration, other configurations could be used without departing from the scope of the invention. For example, each fiber of fiber ring 212 could comprise an OC-12, OC-48, or other capacity ring having any number of STS paths. In addition, although the illustrated embodiment shows two STS paths used for TDM traffic and only one for ATM traffic, other bandwidth allocations could be used without departing from the scope of the invention. For example, where each fiber of fiber ring 212 comprises an OC-12 ring, six STS paths could be allocated to TDM traffic, and six STS paths could be reserved for ATM traffic. The invention contemplates flexibility in design, allowing the variable network configuration depending on, for example, particular traffic patterns and network demands.

System 200 includes a plurality of nodes 214 residing on fiber ring 212. In this embodiment, each node 214 is similar in structure and function to nodes 14 depicted in FIG. 1. Each node 214 includes a signal manager 218, which receives incoming signals from fiber ring 212 and tributaries 216, and configures the incoming signals into a plurality of incoming transport signals. Incoming signals received from fiber ring 12 may include TDM information and/or ATM cells. Incoming signals received from tributaries 216 may include TDM information, ATM cells, and/or legacy data. Each node 214 includes a segmentation and reassembly (SAR) module 220 operable to receive legacy data from tributaries 216 and segment the legacy data into ATM cells. In addition, segmentation and reassembly module 220 operates to receive ATM cells from signal manager 218, and to reassemble the cells into legacy data for transport over tributaries 216.

Like nodes 14 shown in FIG. 1, nodes 214 include an ATM switching fabric 222 and an STM switching fabric 224. ATM switching fabric 222 includes hardware, software, and/or firmware operable to switch, cross-connect or otherwise process ATM cells received from signal manager 218 to prepare those ATM cells for further transmission. In the illustrated embodiment, ATM switching fabric 222 comprises an add/drop multiplexer operable to extract ATM cells from incoming signals, and to add the extracted and/or other ATM cells to signals to be transmitted from node 214.

STM switching fabric 224 includes hardware, software, and/or firmware operable to receive incoming signals comprising TDM information, and to switch, cross-connect, or otherwise process those incoming signals to prepare them for further transmission. In the illustrated embodiment, STM switching fabric 224 includes a time slot interchange. In a particular embodiment, STM switching fabric may further include a sub-rate cross-connect, such as a virtual tributary (VT) cross-connect operable to cross-connect sub-rate STM signals.

In operation, signal manager 218a of node 214a receives incoming signals from fiber ring 212 and/or tributaries 216a. Where the incoming signals comprise legacy data received from tributaries 216a, segmentation and reassembly module 220a may format the legacy data into ATM cells. Signal manager 218a formats all incoming signals into incoming transport signals (in this example, STS-1 signals).

In a manner similar to that described above with respect to FIG. 2a, STM switching fabric 224a receives incoming transport signals containing TDM information and performs time slot interchanging and/or VT cross-connection on these incoming signals to generate switched transport signals carrying TDM information.

Signal manager 218a routes incoming transport signals containing ATM cells to ATM switching fabric 222a, which performs add/drop multiplexing on the incoming transport signals, and formulates switched transport signals containing ATM cells.

Signal manager 218a receives switched transport signals containing ATM cells from ATM switching fabric 222a, and switched transport signals containing TDM information from STM switching fabric 224a. Based, for example, on the content of the signals, and their intended destination, signal manager 218a identifies an STS path 213a–213c over which each switched transport signal will be transmitted.

In this embodiment, all outgoing STM signals carrying TDM information are transmitted over STS paths 213b–213c. This transmission is much like the transmission described with respect to FIG. 2a, in that each STM cell carrying TDM information is mapped into a synchronous payload envelope having overhead information specifying a destination network element. Using uni-directional path-switched ring protection, outgoing STM signals carrying TDM information are transmitted over STS paths 213b and 213c. If a failure in one of the working channels occurs, traffic on the working channels of fiber ring 212 (e.g., the outer loop of fiber 212) is switched to the protection channels (e.g., the inner loop) of fiber ring 212.

Outgoing STM signals carrying ATM cells, on the other hand, are transmitted over a separate STS path, in this case STS path 213a, which has been reserved for ATM traffic. In this embodiment, STS path 213a is reserved exclusively for carrying signals containing ATM cells. This ATM-carrying STS path terminates at each node 214 on fiber ring 212 that has ATM add/drop capability. In this embodiment, STS paths 213a on both working fiber 212w and protection fiber 212p are utilized to transport STM signals containing ATM cells. Rather than using one of the fibers as a protection path for ATM traffic, the invention described in this embodiment uses STS path 213a on protection fiber 212p as a source of additional bandwidth for transporting ATM traffic. ATM layer survivability can be achieved by using, for example, 1+1 virtual path automatic protection switching (VP APS).

This embodiment provides TDM information the same protection scheme offered in a strictly uni-directional path-switched ring configuration, while facilitating add/drop multiplexing of ATM cells transmitted over the same fiber ring. In addition, this configuration provides exceptional flexibility in allocation of bandwidth between TDM and ATM traffic. Adjustment of the bandwidth allotted to either traffic type is accomplished by merely provisioning the STS paths accordingly.

FIG. 2c is a block diagram showing a portion of a two fiber bi-directional line-switched ring 312. In a conventional bi-directional line-switched ring where each fiber supports N channels, channels 1 through N/2 are working channels, while channels N/2+1 through N are protection channels. As a particular example, in the illustrated embodiment, channels 313a–313f of fiber 312a are working channels, while channels 313g–313l of the same fiber are protection channels for working channels 313a–313f, respectively. In the event of a failure on any of the channels 313a–313f, traffic from all of channels 313a–313f is switched to protection channels 313g–313l, respectively. FIG. 2c shows a failure occurring between nodes 314a and 314b of fiber ring 312. Nodes 314a and 314b are configured to recognize this failure, and switch traffic from working channels 313a–313f onto protection channels 313g–313l, respectively.

Figure 2D:
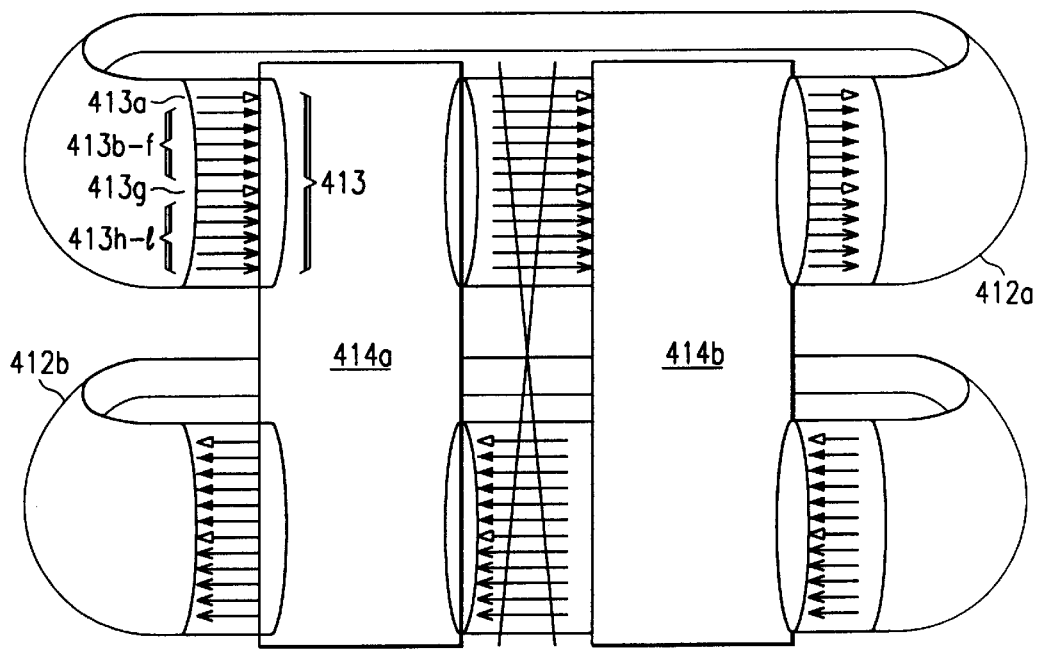

FIG. 2d is a block diagram of a system 400 operable to facilitate communication of TDM information and ATM cells over a common fiber ring using predetermined channels of a bi-directional line-switched fiber ring to transmit ATM traffic. System 400 includes a fiber ring 412 having a pair of fibers 412a and 412b. Alternatively, system 400 could implement a four fiber bi-directional line-switched ring. Each fiber 412 includes a plurality of channels 413. In the illustrated embodiment, rather than classifying channels as either working channels or protection channels, channels are divided into three categories—working, protection, and ATM channels.

In the illustrated embodiment, channels 413b–413f are working channels carrying TDM traffic, while channels 413h–413l are protection channels for working channels 413b–413f. In other words, channels 413b–f and 413h–l function as conventional bi-directional line-switched ring channels carrying TDM traffic. With respect to channels 413a and 413g, in a conventional bi-directional line-switched ring implementation, channel 413g would serve as the protection channel for working channel 413a. In this embodiment, however, channels 413a and 413g, which are reserved for carrying ATM traffic, are excluded from participating in conventional bi-directional line-switched ring protection. Both channels 413a and 413g operate as working channels carrying ATM traffic, and bi-directional line-switched protection is disabled for these ATM carrying channels. When a failure in one of channels 413b–413f occurs, ATM carrying channels 413a and 413g do not participate in ring switching. Instead, ATM layers survivability for traffic carried on ATM channels 413a and 413g can be implemented using an ATM layer protection scheme, such as virtual path 1+1 automatic protection switching (VP APS).

Although the illustrated embodiment shows only one pair of channels reserved for ATM traffic, the invention contemplates provisioning any number of channels for ATM traffic. In addition, although the illustrated embodiment shows a fiber having 12 channels, other configurations could be used, such as, an OC-48 ring.

In the illustrated embodiment, channels are predesignated to carry ATM traffic. To facilitate special treatment of the ATM carrying channels, an indication of the channels carrying ATM traffic can be stored in a storage structure accessible to node 414. In a particular embodiment, indications of the designated channels may be stored in a table located at one or more nodes 414.

In operation, node 414 is configured to receive signals carrying ATM traffic on predesignated ATM carrying channels, and to process those signals in an ATM switching fabric. Each node 414 is further configured to transmit outgoing signals containing ATM cells on the same predesignated channels 413a and 413g of fiber ring 412. Upon detection of a failure in one of the working channels 413a–413f, the affected nodes 414 access the table of predetermined channels to determine whether protection switching applies to each channel. If a failure occurs in on of the working channels 413b–413f, node 414 switches traffic from the working channels 413b–414f to protection channels 413h–413l only. Finding an indication of ATM carrying channels 413a and 413g in the table of predetermined channels, node 414 refrains from protection switching with respect to these channels. Instead, system 400 relies on VP1+1 APS for ATM layer survivability.

This configuration provides significant flexibility in communicating both TDM and ATM traffic on a common fiber ring. Bandwidth can be easily allocated among the signal types merely by selecting an appropriate number of channels devoted to each type. In addition, this configuration conserves ring bandwidth when transmitting ATM traffic. Rather than leaving protection channels idle while working channels transmit information, system 400 uses both working and protection channels to transmit live ATM traffic. System 400 accomplishes this increase in efficiency by utilizing built-in protection switching of the ATM layer, rather than relying on a dedicated physical path on the ring to provide protection.

FIG. 3 is a block diagram of a portion of an exemplary node 14 constructed according to the teachings of the present invention. The portion of node 14 shown in FIG. 3 includes the functionality of signal manager 18, ATM switching fabric 22 and STM switching fabric 24 discussed with respect to FIG. 1. As discussed above, although FIG. 1 depicted signal manager 18, ATM switching fabric 22, and STM switching fabric 24 as separate physical blocks, the invention is not intended to be limited by a particular physical configuration of these functional elements. For example, in the embodiment disclosed in FIG. 3, a portion of the functionality of STM switching fabric 24 resides in one physical block along with signal manager 18, while another portion of the functionality of STM switching fabric 24 resides in a separate physical block 524. The configuration shown in FIG. 3 represents only one exemplary embodiment of the present invention. Other configurations could be used without departing from the scope of the invention.

The particular embodiment shown in FIG. 3 includes a signal manager 518, which receives incoming STM signals carrying TDM information and ATM cells. Because node 14 receives various signal formats, both from ring 14 and tributaries 16, it is desirable to normalize the incoming signals into a common signal format to enable node 14 to similarly process all signal types. I this embodiment, prior to reaching STM signal manager 518, all incoming signals received by node 14 are formatted into transport signals—in this case, synchronous transport signal level-one (STS-1) signals. This process is performed, for example, by one or more interface cards (not explicitly shown) residing between signal manager 518 and fiber ring 12 and/or tributaries 16. In an alternative embodiment, signal manager 518 could receive raw incoming signals and format them into incoming transport signals. STS-1 signals are only one example of a transport signal format. Other signal formats could be used as the transport signal format, such as, STS-12, STS-3c, OC-n, or any other optical or electrical signal format.

In the illustrated embodiment, the incoming signals can be classified into three groups: (i) incoming signals 530 carrying ATM traffic requiring layer processing; (ii) incoming signals 532 carrying VT traffic requiring VT cross-connection; and (iii) pass-through incoming signals 534 carrying either pass-through ATM traffic or pass-through TDM traffic.

STM signal manager 518 receives incoming transport signals 530–532 at an automatic protection switching selector (APS SEL) 540. Automatic protection switching selector 540 determines, based on whether a fault has occurred, whether traffic from the working or the protection channel should be used. In a particular embodiment, automatic protection switching selector includes a table 542 containing indications of channels designated for ATM traffic. In that embodiment, as discussed with respect to FIG. 2d, the ATM carrying channels will not participate in bi-directional line-switched ring switching upon detection of a fault.

STM signal manager 518 further includes a 1:2 bridge 544, which receives incoming transport signals 530–534 from automatic protection switching selector 540, and creates a duplicate set of incoming transport signals 530–534. Bridge 544 sends one set of incoming signals to a first time slot interchange (TSI #1) 546, and the duplicate set of incoming signals to a second time slot interchange (TSI #2) 548. First time slot interchange 546 is used for time slot interchange of transport signals without sub-rate processing. First time slot interchange 546 receives incoming transport signals carrying TDM information not needing VT processing, and prepares those signals for further transmission over fiber ring 12. First time slot interchange also receives incoming transport signals carrying ATM cells bound for a different destination node than the current node 14. In that case, first time slot interchange processes the incoming STM signal carrying ATM cells as any other STM signal, passing the ATM cells transparently through node 14 without loading ATM switching fabric 22 of that node 14.

A second time slot interchange 548 receives a set of the incoming transport signals, and rearranges the time slots associated with those signals according to the signals' contents. In this example, time slot interchange 548 groups all incoming signals containing TDM information into time slots 1 through n, and groups all signals containing ATM cells into time slots n+1 through x. This rearrangement facilitates passage of TDM signals to a VT switching fabric 524 and ATM signals to an ATM switching fabric 522. In the event that signal manager 518 receives more incoming signals than the ATM and TDM switching fabrics accept, second time slot interchange 548 may further operate to compress the incoming signals into a number of signals that can be accepted by the TDM and ATM switching fabrics.

A VT switching fabric 524 receives incoming signals containing TDM information, and performs switching operations on those incoming signals requiring VT cross-connection. In this example, VT switching fabric cross-connects at a VT1.5 granularity. Other granularities of cross-connection could be performed without departing from the scope of the invention.

ATM switching fabric 522 receives incoming signals containing ATM cells, and performs switching operations on those incoming signals requiring ATM layer processing. In this example, ATM switching fabric comprises an ATM add/drop multiplexer.

Signal manager 518 receives switched transport signals from VT switching fabric 524 and ATM switching fabric 522 at a third time slot interchange 550. Third time-slot interchange 550 operates to rearrange the time slots associated with the switched transport signals received so that each signal is associated with the same time slot as it was before the rearrangement that occurred in second time slot interchange 548. Third time slot interchange 550 may further operate to de-compress signals that had previously been compressed to accommodate the number of signals acceptable by the VT and ATM switching fabrics.

Signal manager 518 further includes a multiplexer (2:1 SEL) 552, which receives switched transport signals from first time slot interchange 546 and from third time slot interchange 550. Multiplexer 552 operates to reverse the function provided by 1:2 bridge 544, by selecting, for each time slot, either the signal received from first time slot interchange 546 or the signal received from third time slot interchange 550. If the signals received at multiplexer 552 contain VT or ATM switched signals, multiplexer 552 selects the signals from third time slot interchange 550. Otherwise, if the outgoing signals are pass-through signals, multiplexer 552 chooses the signal from first time slot interchange 546. The unselected duplicate versions of the selected signals are discarded.

Signal manager 518 further includes an automatic protection switching distributor (APS distr) 554. Automatic protection switching distributor 554 receives the selected outgoing STM signals from multiplexer 552, and determines whether those outgoing signals should be transmitted over working or protection channels of fiber ring 12 and/or tributaries 16.

In operation, STM signal manager 518 receives a plurality of incoming signals formatted as incoming transport signals. These signals contain TDM information and ATM cells (either received in the incoming signal or segmented from legacy data). Automatic protection switching selector 540 chooses incoming signals from either working or protection channels depending on the configuration of the circuit and whether a fault has been detected. In a particular mode of operation, where ring 12 is configured as a bi-directional line-switched ring, automatic protection switching selector 540 consults table 542 to identify predetermined ATM-carrying channels. Automatic protection switching selector 540 disables line switching protection for these predesignated ATM-carrying channels.

Automatic protection switching selector 540 next passes the selected signals to 1:2 bridge 544, where the signals are copied to form a first set of incoming signals 545 and a second set of incoming signals 547. First set of incoming signals 545 are passed to first time slot interchange 546, where STS traffic and pass through ATM traffic is switched at STS-1 level granularity.

Second set of incoming signals 547 is passed to second time slot interchange 548, where both signals are rearranged so that TDM traffic is associated with time slots 1 through n, and ATM traffic is associated with time slots n+1 through x. Time slots 1 through n of second time slot interchange 548 feed into VT switching fabric 524. Incoming signals carrying VT traffic requiring VT cross connection are processed in VT switching fabric 524. Time slots n+1 through x carry incoming signals containing ATM cells. Those incoming signals containing ATM traffic requiring ATM layer processing are processed by ATM switching fabric 522.

Switched outgoing transport signals 551 emerge from VT switching fabric 524 and ATM switching fabric 522, and are received by third time slot interchange 550. Third time slot interchange 550 rearranges second set of outgoing signals 551 so that each outgoing signal is associated with the same time slot that the incoming signal was originally associated with.

Multiplexer 552 receives first set of outgoing signals 549 and second set of outgoing signals 551, and selects a signal to occupy each time slot 1 through x. Multiplexer 552 selects outgoing signals from second set of outgoing signals 551 if those signals have been VT cross connected or ATM cross connected. Multiplexer 552 selects outgoing signals from first set of outgoing signals 549 if those signals carry STS traffic or pass-through ATM traffic. Unselected signals are discarded. Line/tributary automatic protection switching distributor 554 receives the selected outgoing STM signals and determines whether those signals should be transmitted on working or protection channels, depending on the ring configuration and whether a fault has been detected.

A signal mapper (not explicitly shown) receives outgoing transport signals and maps those signals into outgoing signals for transmission over ring 12. In one embodiment, the signal mapper maps all outgoing signals carrying ATM cells bound for a particular destination into a common synchronous payload envelope, while mapping all outgoing signals carrying TDM information bound for a particular destination into a separate synchronous payload envelope. In another embodiment, the signal mapper maps all outgoing signals containing ATM cells onto a particular STS path designated for ATM traffic, while mapping all outgoing signals carrying TDM information onto a separate STS path designated for carrying TDM information.

Figure 4A:
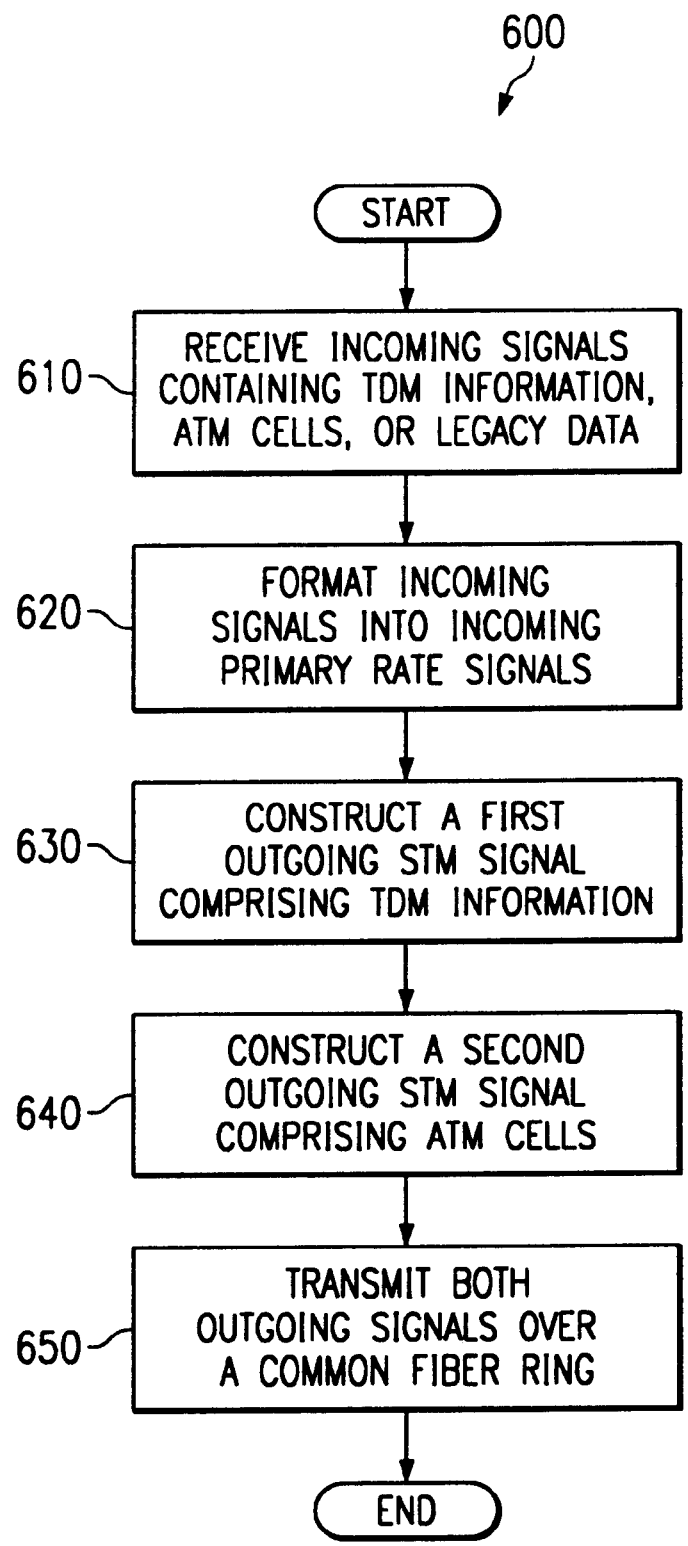
FIGS. 4a–4c are flow charts showing exemplary methods of communicating TDM information and ATM cells over a common fiber ring.
Figure 4B:
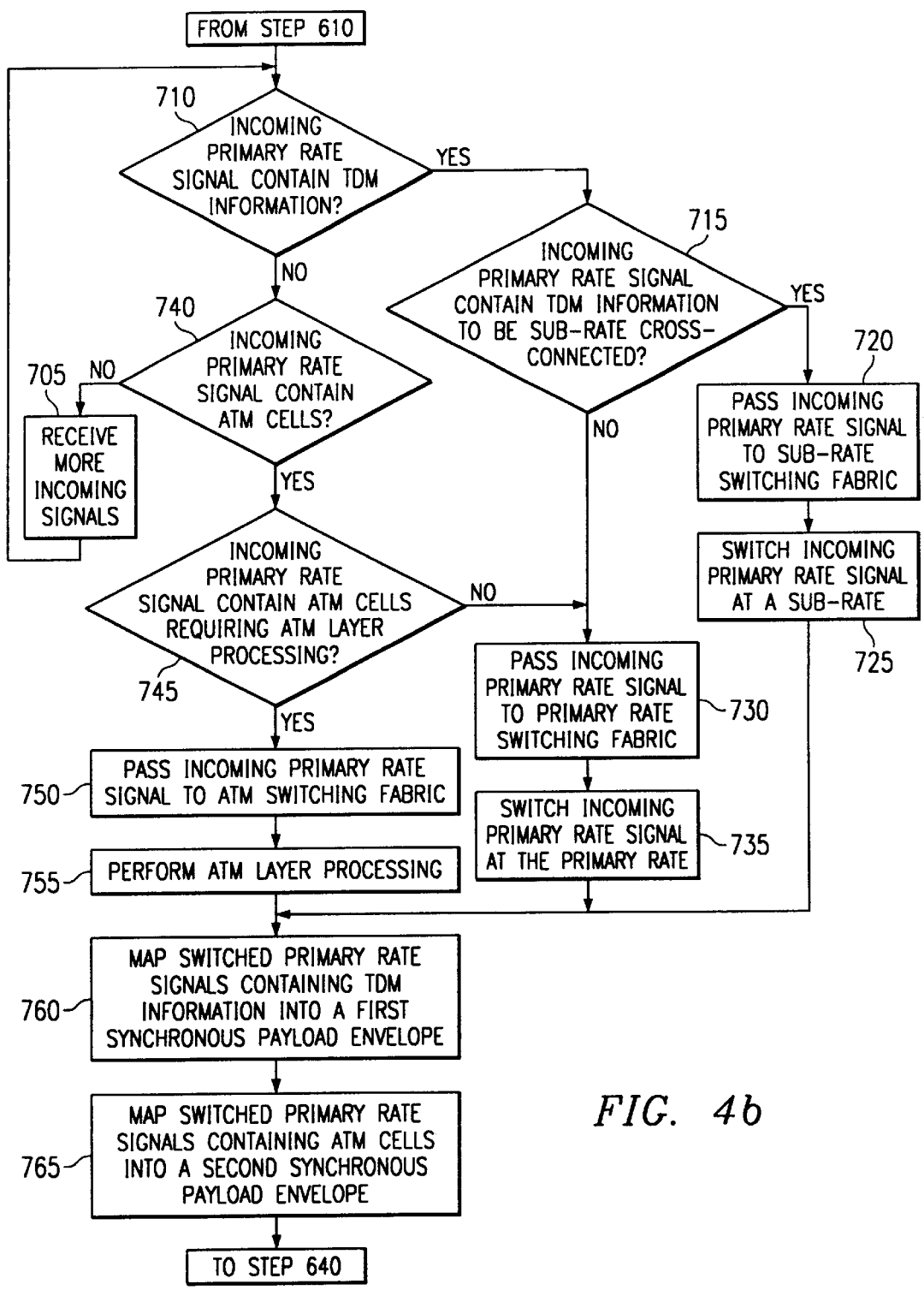
Figure 4C:
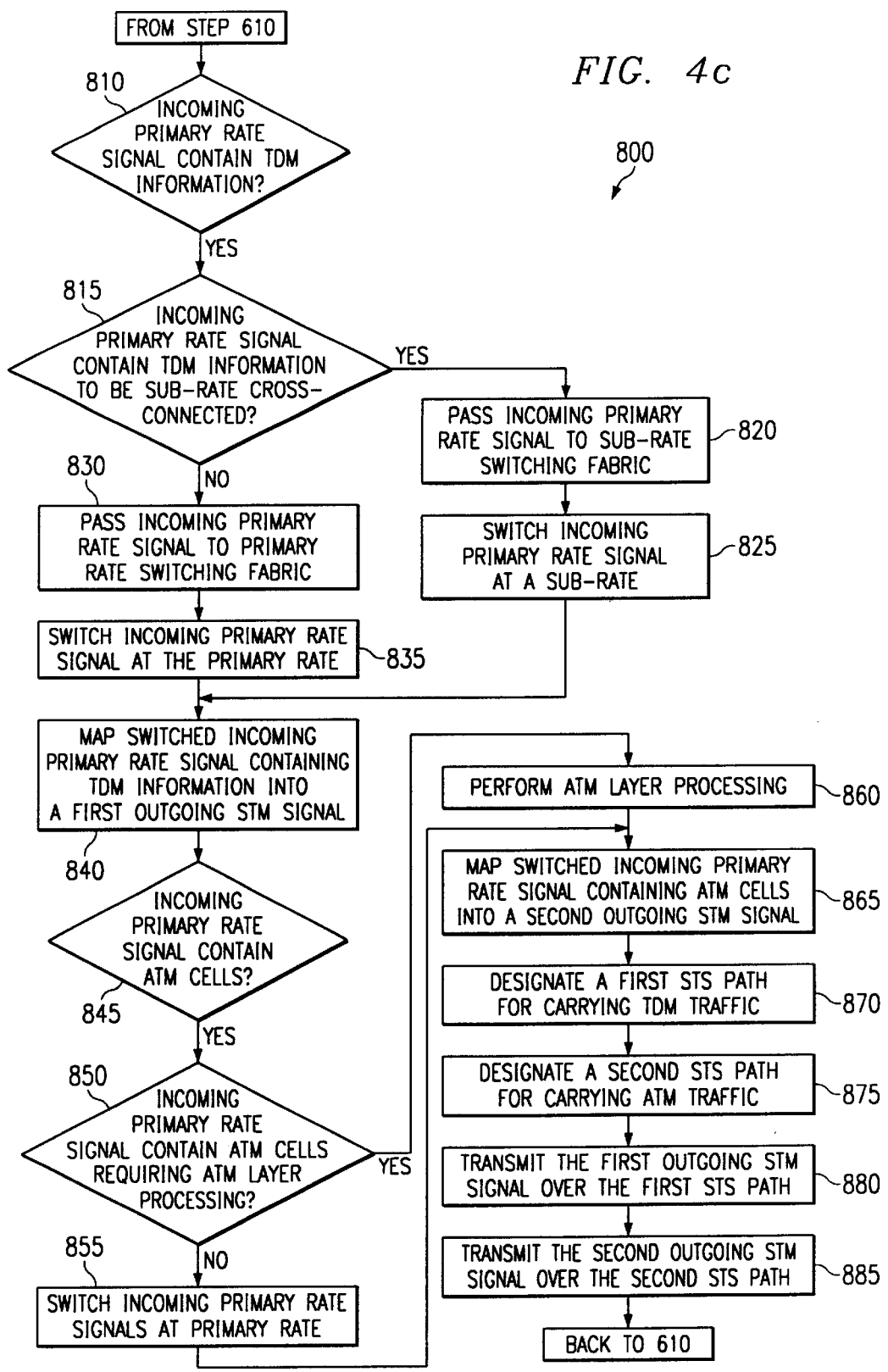

FIGS. 4a–4c are flow charts showing exemplary methods of communicating TDM information and ATM cells over a common fiber ring.

FIG. 4a is a flow chart showing a general method 600 of communicating TDM information and ATM cells over a common fiber ring. The method 600 begins at step 610 where signal manager 18 (FIG. 1) receives a plurality of incoming signals containing TDM information, ATM cells, and/or legacy data. This information may be received, for example, from fiber ring 12 and/or tributary 16. Signal manager 18 proceeds by formatting the incoming signals into a plurality of incoming transport signals at step 620. In a particular embodiment, signal manager 18 formats all incoming signals into STS-1 signals. Other signal formats could be used without departing from the scope of the invention.

Signal manager 18, in cooperation with STM switching fabric 24, constructs from a first plurality of incoming transport signals comprising TDM information a first outgoing STM signal comprising TDM information at step 630. Details regarding the method 630 of constructing a first outgoing STM signal comprising TDM information will be described further with respect to FIGS. 4b and 4c.

In addition, signal manager 18, in cooperation with ATM switching fabric 22, constructs from a second plurality of incoming transport signals containing ATM cells a second outgoing STM signal comprising ATM cells at step 640. Details of the method 640 of constructing a second outgoing STM signal comprising ATM cells will be described further with reference to FIGS. 4b and 4c.

Node 14 then transmits both the first and second outgoing signals over a common fiber ring at step 650. Additional details of the method 650 of transmitting both outgoing signals over a common fiber ring will be described with respect to FIG. 4c.

FIG. 4b is a block diagram showing additional details of an exemplary method 630 of constructing a first outgoing signal comprising TDM information, and an exemplary method 640 of constructing a second outgoing signal comprising ATM cells according to the teachings of the present invention.

The method 630 begins at step 710 where signal manager 18 determines whether any of the incoming transport signals contain TDM information. If signal manager detects an incoming signal containing TDM information, it determines at step 715 whether that incoming signal requires sub-rate cross-connection. If the incoming transport signal requires sub-rate cross-connection, signal manager passes the incoming signal to a sub-rate cross-connect within STM switching fabric 24 at step 720, where sub-rate cross-connection takes place at step 725. Signal manager 18 passes the incoming transport signals containing TDM information and not requiring sub-rate cross-connection to a primary rate switching fabric within STM switching fabric 24 at step 730. There, those signals are switched at the primary rate at step 735.

Signal manager 18 also determines at step 740 whether any incoming transport signals contain ATM cells. For those signals containing ATM cells, signal manager 18 also determines at step 745 whether those cells require ATM layer processing. Signal manager 18 transmits incoming transport signals containing ATM cells that do not require ATM layer processing (e.g., pass-through ATM traffic) to the primary rate switching fabric of STM switching fabric 24 at step 730. Signal manager 18 passes incoming transport signals requiring ATM layer processing to ATM switching fabric 22 at step 750, where ATM layer processing is performed at step 755.

Switched transport signals containing TDM information are mapped into a first synchronous payload envelope at step 760. In this example, the first synchronous payload envelope comprises a first outgoing STM signal containing TDM information. Switched transport signals containing ATM cells (whether or not ATM layer processed) are mapped into a second synchronous payload envelope at step 765. In this example, the second synchronous payload envelope comprises a second outgoing STM signal containing ATM cells. Both the first and second outgoing STM signals are transmitted over a common fiber ring at step 640.

FIG. 4c is a block diagram showing details of an exemplary method 630 of constructing a first outgoing STM signal containing TDM information, a method 640 of constructing a second outgoing STM signal containing ATM cells, and a method 650 of transmitting the first and second outgoing signals over a common fiber ring.

The method 630 of constructing a first outgoing STM signal containing TDM information begins at step 810 where signal manager 18 determines whether any of the incoming transport signals contain TDM information. If signal manager detects an incoming signal containing TDM information, it determines at step 815 whether that incoming signal requires sub-rate cross-connection. If the incoming transport signal requires sub-rate cross-connection, signal manager passes the incoming signal to a sub-rate cross-connect within STM switching fabric 24 at step 820, where sub-rate cross-connection takes place at step 825. Signal manager 18 passes the incoming transport signals containing TDM information and not requiring sub-rate cross-connection to a primary rate switching fabric within STM switching fabric 24 at step 830, where those signals are switched at the primary rate at step 835. Switching manager 18 receives switched transport signals from STM switching fabric 24 and maps the switched transport signals containing TDM information into a first outgoing STM signal at step 840.

The method 640 of constructing a second outgoing STM signal containing ATM cells begins at step 845, where signal manager 18 determines whether any incoming transport signals contain ATM cells. For those signals containing ATM cells, signal manager 18 also determines at step 850 whether those cells require ATM layer processing. Signal manager 18 transmits incoming transport signals containing ATM cells that do not require ATM layer processing (e.g., pass-through ATM traffic) to the primary rate switching fabric of STM switching fabric 24, where STM switching fabric 24 performs primary rate switching at step 855. Signal manager 18 passes incoming transport signals requiring ATM layer processing to ATM switching fabric 22, where ATM layer processing is performed at step 860. Signal manager 18 receives switched transport signals containing ATM cells and maps those signals into a second outgoing STM signal at step 865.

Signal manager 18 designates a first STS path for carrying TDM traffic at step 870, and designates a second STS path for carrying ATM traffic at step 875. Node 14 then transmits the first outgoing STM signal containing TDM information over the first STS path at step 880, and transmits the second outgoing STM signal containing ATM cells over the second STS path at step 885. The first and second STS paths may comprise STS paths of a uni-directional path-switched ring or may comprise pairs of working and protection channels of a bi-directional line-switched ring.

This configuration presents another example of the present invention's ability to facilitate flexible bandwidth allocation between TDM traffic and ATM traffic.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A method of transporting asynchronous transfer mode cells and time-division multiplexed information over a common fiber ring, the method comprising:

receiving a plurality of incoming signals comprising asynchronous transfer mode cells, legacy data, or time-division multiplexed information;

formatting the plurality of incoming signals into a first plurality of incoming transport signals comprising asynchronous transfer mode cells and a second plurality of incoming transport signals comprising time-division multiplexed information;

constructing from the first plurality of incoming transport signals a first outgoing synchronous transfer mode signal comprising at least one asynchronous transfer mode cell;

constructing from the second plurality of incoming transport signals a second outgoing synchronous transfer mode signal comprising time-division multiplexed information; and transmitting the first and second outgoing synchronous transfer mode signals over the common fiber ring.

2. The method of claim 1, wherein receiving a plurality of incoming signals comprises receiving line signals from the fiber ring.

3. The method of claim 1, wherein receiving a plurality of incoming signals comprises receiving tributary signals.

4. The method of claim 1, wherein constructing a first outgoing synchronous transfer mode signal comprises:

performing add/drop multiplexing on the asynchronous transfer mode cells -of the first plurality of incoming transport signals to form a first plurality of switched transport signals; and mapping ones of the first plurality of switched transport signals having a common destination into a first synchronous payload envelope.

5. The method of claim 4, wherein constructing a second outgoing synchronous transfer mode signal comprises mapping time division multiplexed information into a second synchronous payload envelope.

6. The method of claim 1, wherein transmitting the first and second outgoing synchronous transfer mode signals comprises transmitting the first outgoing synchronous transfer mode signal to a destination node by way of an intermediate node, wherein the asynchronous transfer mode cells of the first outgoing synchronous transfer mode signal pass transparently through the intermediate node.

7. The method of claim 1, wherein the fiber ring comprises:

a first synchronous transport signal path designated for transporting synchronous transfer mode signals carrying asynchronous transfer mode cells; and a second synchronous transport signal path configured as a uni-directional path-switched ring and operable to transmit synchronous transfer mode signals carrying time-division multiplexed information; and a plurality of nodes, at least some of the nodes operable to perform add/drop multiplexing of asynchronous transfer mode cells, and wherein the first synchronous transport signal path is terminated at each node operable to perform add/drop multiplexing of asynchronous transfer mode cells.

8. The method of claim 7, wherein constructing a first outgoing synchronous transfer mode signal and transmitting the first outgoing synchronous transfer mode signal comprise:

performing add/drop multiplexing on the asynchronous transfer mode cells of the first plurality of incoming transport signals to form a first plurality of switched transport signals;

mapping at least some of the first plurality of switched transport signals into at the first synchronous transfer mode signal; and transmitting the first outgoing synchronous transfer mode signal over the first synchronous trasport signal path.

9. The method of claim 8, wherein transmitting the first and second outgoing synchronous transfer mode signals over the same fiber ring comprises:

transmitting the first outgoing synchronous transfer mode signal over the first synchronous transport signal path; and transmitting the second outgoing synchronous transfer mode signal over the second synchronous transport signal path.

10. The method of claim 1, wherein the fiber ring comprises a bi-directional line-switched ring having a plurality of working channels and a plurality of protection channels, and further comprising designating a working channel and a protection channel of the bi-directional line-switched ring for transporting asynchronous transfer mode signals.

11. The method of claim 10, wherein transmitting the first and second outgoing synchronous transfer mode signals over the same fiber ring comprises:

transmitting the first outgoing synchronous transfer mode signal over the designated working or protection channel of the bi-directional line-switched ring; and transmitting the second outgoing synchronous transfer mode signal over one of the remaining channels of the bi-directional line-switched ring.

12. The method of claim 11, further comprising:

detecting a fault in one of the working channels of the bi-directional line-switched ring;

disabling protection switching for the designated channels; and switching traffic on the remaining channels from the working channels to the protection channels.

13. A method of communicating asynchronous transfer mode cells and time-division multiplexed information over a common fiber ring, the method comprising:

configuring the fiber ring as a bi-directional line-switched ring having a plurality of working channels and a plurality of protection channels;

designating at least one working channel and at least one protection channel associated with the at least one working channel for carrying asynchronous transfer mode cells;

disabling bi-directional line-switched ring protection with respect to the designated channels;

transmitting synchronous transport mode signals carrying, asynchronous transfer mode cells over the designated working and protection channels; and transmitting time-division multiplexed information over at least one of-the remaining non-designated channels.

14. The method of claim 13, wherein designating at least one working channel and at least one protection channel comprises:

identifying a working channel and a protection channel to be used for communicating asynchronous transfer mode cells;

storing in a memory an indication of the identified working and protection channels.

15. The method of claim 14, wherein disabling bi-directional line-switched ring protection with respect to the designated channels comprises:

accessing the memory in response to receiving a signal carrying asynchronous transfer mode cells;

identifying the designated channels; and disabling line-switched protection with respect to the identified channels.

16. A method of communicating asynchronous transfer mode cells and time-division multiplexed information over a common fiber ring, the method comprising:

configuring the fiber ring as a uni-directional path-switched ring having a plurality synchronous transfer signal paths;

designating at least one synchronous transfer signal path for communicating synchronous transfer mode signals carrying asynchronous transfer mode cells;

disabling uni-directional path-switched ring protection with respect to the designated synchronous transfer signal path;

transmitting synchronous transport mode signals carrying asynchronous transfer mode cells over the designated synchronous transfer signal path; and transmitting time-division multiplexed information over at least one remaining non-designated synchronous transfer signal path.

17. A system for communicating asynchronous transfer mode cells and time-division multiplexed information using a common fiber ring, the system comprising a first node operable to receive incoming signals carrying asynchronous transfer mode cells, legacy data, and/or time-division multiplexed information, and to transmit outgoing synchronous transfer mode signals comprising asynchronous transfer mode cells and time-division multiplexed information on a common fiber ring, the first node comprising:

an asynchronous transfer mode switching fabric operable to receive the incoming signals carrying asynchronous transfer mode cells, to add and drop asynchronous transfer mode cells to and from those signals, sand to transmit a first outgoing synchronous transfer mode signal comprising at least one asynchronous transfer mode cell;

an synchronous transfer mode switching fabric operable to receive and process the incoming signals carrying time-division multiplexed information, and to transmit a second outgoing synchronous transfer mode signal comprising time-division multiplexed information; and a signal manager operable to receive the incoming signals, to pass the incoming signals to the asynchronous transfer mode and synchronous transfer mode switching fabrics, to receive the first and second outgoing synchronous transfer mode signals from the switching fabrics, and to facilitate transmission of the first and second outgoing signals over the fiber ring.

18. The system of claim 17, wherein the incoming signals comprise line signals received from the fiber ring, the line signals comprising asynchronous transfer mode cells and time-division multiplexed information.

19. The system of claim 17, wherein the incoming signals comprise tributary signals received from a tributary coupled to the first node.

20. The system of claim 17, wherein the asynchronous transfer mode switching fabric comprises an add/drop multiplexer operable to drop asynchronous transfer mode cells from the incoming signals containing asynchronous transfer mode cells and to add asynchronous transfer mode cells to a first synchronous payload envelope reserved for transmitting asynchronous transfer mode cells from the first node to a destination network element.

21. The system of claim 20, further comprising an intermediate node located on the fiber ring between the first node and the destination network element, and wherein the first node operates to transmit the first outgoing signal to the destination network element through the intermediate node, transparently to the intermediate node.

22. The system of claim 17, wherein the fiber ring comprises:

a first synchronous trasport signal path operable to facilitate transmission of synchronous transfer mode signals carrying asynchronous transfer mode cells; and a second synchronous trasport signal path configured as a uni-directional path-switched ring and operable to facilitate transmission of synchronous transfer mode signals carrying time-division multiplexed information.

23. The system of claim 17, further comprising a segmentation and reassembly module operable to receive the incoming signals containing legacy data and to format the legacy data into asynchronous transfer mode cells, and to pass the formatted asynchronous transfer mode cells to the asynchronous transfer mode switching fabric.

24. The system of claim 17, wherein the fiber ring comprises a bi-directional line-switched ring having a plurality of working channels and a plurality of protection channels, and wherein at least one working channel and at least one protection channel of the bi-directional line-switched ring are reserved for transporting asynchronous transfer mode signals.

25. A system for communicating asynchronous transfer mode cells and time-division multiplexed information using a common fiber ring, the system comprising a plurality of nodes operable to receive incoming signals carrying asynchronous transfer mode cells, legacy data, and/or time-division multiplexed information, each of the plurality of nodes comprising:

an asynchronous transfer mode switching fabric operable receive the incoming signals carrying asynchronous transfer mode cells, to add and drop asynchronous transfer mode cells to and from those signals, and to transmit a first outgoing synchronous transfer mode signal comprising at least one asynchronous transfer mode cell;

an synchronous transfer mode switching fabric operable to receive and process the incoming signals carrying time-division multiplexed information, and to transmit a second outgoing synchronous transfer mode signal comprising time-division multiplexed information; and a signal manager operable to receive the incoming signals, to pass the incoming signals to the asynchronous transfer mode and synchronous transfer mode switching fabrics, to receive the first and second outgoing synchronous transfer mode signals from the switching fabrics, and to facilitate transmission of the first and second outgoing signals over the fiber ring.

26. The system of claim 25, wherein the asynchronous transfer mode switching fabric comprises an add/drop multiplexer operable to drop asynchronous transfer mode cells from the incoming signals containing asynchronous transfer mode cells and to add asynchronous transfer mode cells to a first synchronous payload envelope reserved for transmitting asynchronous transfer mode cells from the at least one node to a destination node.

27. The system of claim 26, wherein the plurality of nodes comprises an intermediate node located on the fiber ring between the at least one node and the destination node, and wherein the at least one node operates to transmit the first outgoing signal to the destination node through the intermediate node, transparently to the intermediate node.

28. The system of claim 25, wherein the fiber ring comprises:

a first synchronous trasport signal path operable to facilitate transmission of synchronous transfer mode signals carrying asynchronous transfer mode cells, the first synchronous trasport signal path terminated at each of the nodes on the fiber ring that is operable to perform add/drop multiplexing of asynchronous transfer mode cells; and a second synchronous trasport signal path configured as a uni-directional path-switched ring and operable to facilitate transmission of synchronous transfer mode signals carrying time-division multiplexed information.

29. The system of claim 25, further comprising a segmentation and reassembly module operable to receive the incoming signals containing legacy data and to format the legacy data into asynchronous transfer mode cells, and to pass the formatted asynchronous transfer mode cells to the asynchronous transfer mode switching fabric.

* * * * *

UNITED STATES PATENT AND TRADEMARK OFFICE
CERTIFICATE OF CORRECTION

PATENT NO.    : 6,501,758 B1
DATED         : December 31, 2002
INVENTOR(S)   : David X. Chen et al.

It is certified that error appears in the above-identified patent and that said Letters Patent is hereby corrected as shown below:

<u>Title page,</u>
Item [56], References Cited, U.S. PATENT DOCUMENTS, third reference, after "5,867,502" insert -- 5,920,412     07/1999     Chang   359/128 --

<u>Column 3,</u>
Line 16, after "manager" insert -- 18 --.

<u>Column 9,</u>
Line 55, after "occurs in" delete "on" and insert -- one --.

<u>Column 10,</u>
Line 30, after "both from" delete "ring 14" and insert -- ring 12 --.
Line 33, after "signal types." delete "I" and insert -- In --.

<u>Column 13,</u>
Lines 51 and 55, after "signal manager" insert -- 18 --.

<u>Column 14,</u>
Line 29, after "signal manager" insert -- 18 --.
Line 33, after "manager" insert -- 18 --.

<u>Column 15,</u>
Line 37, after "over" delete "the" and insert -- a --.

<u>Column 16,</u>
Line 20, after "signals" delete "into".
Line 23, after "synchronous" delete "trasport" and insert -- transport --.

UNITED STATES PATENT AND TRADEMARK OFFICE
CERTIFICATE OF CORRECTION

PATENT NO. : 6,501,758 B1
DATED : December 31, 2002
INVENTOR(S) : David X. Chen et al.

It is certified that error appears in the above-identified patent and that said Letters Patent is hereby corrected as shown below:

Column 18,
Lines 26 and 28, after "synchronous" delete "trasport" and insert -- transport --.

Column 20,
Lines 1, 4 and 9, after "synchronous" delete "trasport" and insert -- transport --.

Signed and Sealed this

Sixteenth Day of December, 2003

JAMES E. ROGAN
*Director of the United States Patent and Trademark Office*